May 3, 1955 — O. J. KEILHOLZ — 2,707,583
LURE DISPENSER
Filed Nov. 29, 1952
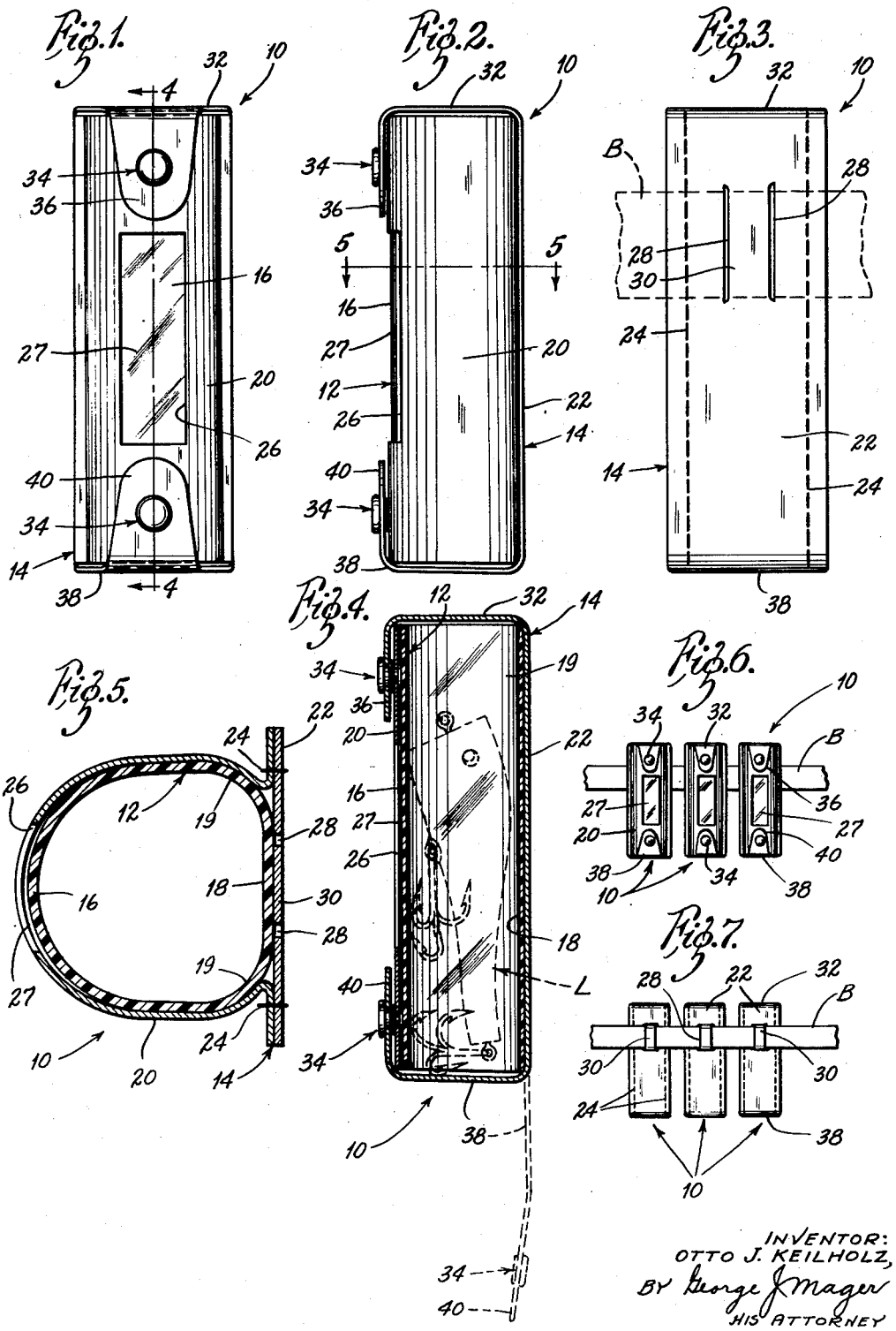
INVENTOR:
OTTO J. KEILHOLZ,
BY George J. Mager
HIS ATTORNEY United States Patent Office 2,707,583
Patented May 3, 1955

2,707,583

LURE DISPENSER

Otto J. Keilholz, St. Louis, Mo.

Application November 29, 1952, Serial No. 323,250

1 Claim. (Cl. 224—26)

The present invention relates generally to a novel accessory designed for use by fisherman. More particularly, this invention relates to a device which may be, so to speak, worn by a fisherman; which when worn will in no way interfere with complete freedom of arm and leg movements; which may enclose a lure and its included hook elements in such manner as to prevent fortuitous injury to the person wearing the device; which is provided with means for facilitating the deposit and withdrawal of a lure; which is light in weight and simple in construction, as will appear.

Every fisherman is well aware of the personal injury factor and the problems involved in the handling of lures, particularly those equipped with a plurality of treble hooks. The lures invariably become entangled within the container which encloses them, and separation of them is a chore which is not only aggravating, but which also involves the risk of personal injury.

The primary object of the present invention is to provide a device adapted in a great measure to overcome the problems and the dangers referred to.

To this end the invention provides a tubular receptacle or container encased in a flexible cover or sheathing, and provided with means for removably affixing the receptacle to an article of clothing worn by the fisherman. Both ends of the receptacle are normally closed by upper and lower flap members integrally formed with the cover, and the flap members are maintained in closed position by glove fasteners or the like.

In such closed position of the flaps, a lure positioned within the container cannot come into contact with the person of the fisherman. Preferably, the receptacle proper is formed of transparent plastic material, and an opening is provided in the sheathing through which the lure may be observed. The lure may be easily and quickly dispensed by manipulating the lower flap to open position. With the latter thereupon returned to closed position, another lure may be easily and quickly inserted by manipulating the upper flap to open position.

A more comprehensive understanding of the invention and its objectives and features may be had from the detailed description thereof to follow with reference to the accompanying drawing, wherein the preferred embodiment is illustrated.

In said drawing:

Figure 1 is a front elevational view of a lure containing and dispensing device which incorporates the principles of the present invention;

Figure 2 is a side elevational view thereof;

Figure 3 is a rear elevational view thereof;

Figure 4 is a central vertical sectional view taken approximately on the line 4—4 of Figure 1, with a typical lure being shown in broken lines and contained within the device;

Figure 5 is an enlarged horizontal sectional view taken on the line 5—5 of Figure 2;

Figure 6 is a view on a reduced scale, demonstrating the disposition of a plurality of dispensers on a portion of a conventional trousers belt, said dispensers appearing in front elevation; and Figure 7 is a similar view with the dispensers appearing in rear elevation.

The device comprising the present invention is indicated as a whole by the numeral 10. It includes a tubular member 12, open at both ends, and enclosed within a flexible casing or sheathing generally designated 14. Preferably but not necessarily, the tubular member 12 is formed of transparent plastic material, and the sheathing of leather.

The preferable horizontal cross-sectional configuration of the member 12 is portrayed on an enlarged scale in Figure 5, where it is seen that it includes a semi-circular front wall portion 16, a flat rear wall portion 18, and a pair of integral arcuately formed wall portions 19 which join said front and rear wall portions.

The casing or sheathing 14 consists of two thin pieces of leather designated 20 and 22. The first of these is disposed about and embraces the entire semi-circular wall portion 16 and the major portion of the arcuately formed wall portions 19 of the tubular member 12, as also best seen in Figure 5. Said view likewise demonstrates that the second leather piece 22 lies against the flat wall portion 18 of said tubular member, and with reference also to Figure 3, that two lines of stitching 24 adjacent their aligned marginal edges serve to integrate the pieces 20 and 22 about the tubular member 12 longitudinally coextensive therewith.

It is noted at this time and should be manifest, that in practice the two pieces of leather forming the sheathing 14 are first cut and sewn together, whereupon the tubular member 12 is inserted, the inherent resiliency of the leather serving to maintain said tubular member in position without the use of any fastening medium.

Numeral 26 designates a rectangular opening formed centrally in the front leather piece 20 to provide a window 27, whereby the fisherman can determine at a glance the nature of the lure contained in the device. A plug type lure designated L is exemplarily illustrated in broken lines in Figure 4. Obviously, the configuration of the opening 26 may be varied from that shown in the drawing.

Numerals 28 indicate a pair of spaced vertical slits cut in the back leather piece 22 preferably above the horizontal centerline of the device 10, whereby to provide a loop portion 30 so that the device 10 may be removably mounted on a trousers belt or the like B, as demonstrated in Figures 6 and 7.

An upper end closure flap designated 32 is integrally formed on the sheathing piece 22, and is provided with the female element of a conventional glove fastener generally designated 34. Said flap terminates in a free end portion 36 for facilitating opening and closing manipulations as is understood, the male element of the fastener 34 being secured to the leather piece 20.

A lower end closure flap designated 38 is also integrally formed on the sheathing piece 22, and is likewise provided with the female element of a conventional glove fastener 34. The flap 38 terminates in a free end portion 40 for facilitating the opening and closing operations thereof, the male element of this lower fastener 34 also being secured to the leather piece 20.

Although the manner in which the invention may be employed should be manifest from the foregoing description and an inspection of the drawing, a brief explanation will be given.

Assuming for example that a fisherman selects six lures from his bait box, he would slide five of the dispensers 10 onto his belt, after having deposited one of the lures in each dispenser. The sixth lure he would attach to his line, as is understood. Thus equipped, he can embark in a boat or on a float, and enjoy the sport of fishing with the use of any one of the lures which he carries.

Thus, assuming that he wishes to change lures, he may select one from among those he carries by simply tilting the five dispensers manually upwardly to observe via the windows 27, which dispenser contains the lure he desires to use. Having determined this, he grasps the free end 40 of the lower flap 38 with the thumb and forefinger of one hand and unsnaps the lower glove fastener, whereupon the lure will glide gently into the palm of his other hand.

It is noted with particular reference to Figure 5, that the inner periphery of the tubular member 12 is smooth and substantially arcuate throughout, so that irrespective of the number of hooks on a particular lure, or the position which the hooks happen to occupy, said lure will slide out by gravity.

After the selected lure has been dispensed, the lower flap 38 is closed. Then the fisherman grasps the free end 36 of the upper flap 32 with the thumb and forefinger of one hand, unsnaps the upper glove fastener to raise said flap, and thereupon drops the therefore employed lure into the dispenser with his other hand. Thereafter the flap 32 is returned to its normal closed position.

In view of the foregoing, it should be manifest that the present invention provides an inexpensive accessory for a fisherman, which is simple in construction and operation.

Obviously, the invention may admit of slight modifications without departing from the principles thereof. Therefore I do not desire to be limited to the precise structural details illustrated and described, the scope of the invention being defined in the claim hereunto appended.

What I claim is:

A device for containing and dispensing a lure, comprising in combination: a tubular member of transparent plastic material open at both ends and including integrally formed a substantially semicircular front wall portion, a flat rear wall portion, and arcuate wall portions joining said front and rear wall portions; a preformed flexible sheathing disposed about said tubular member, said sheathing including a front and a back piece of leather or similar material integrated by a line of stitching adjacent each of the aligned side marginal edges thereof, each line of stitching being longitudinally coextensive with the top to bottom extent of said tubular member; an upper and a lower flap integral with said back piece of material and adapted to respectively close the upper and lower open ends of the tubular member aforesaid; a glove fastener assembly for releasably securing the upper flap, and a glove fastener assembly for releasably securing the lower flap in closed position, the male element of each fastener assembly being affixed to the front piece of material in cooperative disposition relatively to the female element thereof, each female element being rigidly secured to one of said flaps; a free terminal end portion on each flap adapted to facilitate the manipulation of the flap into open and closed positions; an opening formed in the front leather piece of said sheathing providing a window for visibly exhibiting the lure enclosed in the tubular member aforesaid; and a loop produced by a pair of spaced vertical slits formed in the back leather piece of said sheathing for removably mounting said device on a belt or the like.

References Cited in the file of this patent

UNITED STATES PATENTS

| | | |
|---|---|---|
| 2,346,185 | Perry | Apr. 11, 1944 |
| 2,353,178 | Moore | July 11, 1944 |
| 2,513,538 | Williams | July 4, 1950 |
| 2,548,080 | Thorn | Apr. 10, 1951 |
| 2,566,569 | Jensen | Sept. 4, 1951 |